United States Patent
Winner et al.

(10) Patent No.: US 6,889,161 B2
(45) Date of Patent: May 3, 2005

(54) METHOD FOR RECOGNIZING A CHANGE IN LANE OF A VEHICLE

(75) Inventors: Hermann Winner, Bietigheim (DE); Jens Lueder, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/311,176

(22) PCT Filed: Feb. 13, 2002

(86) PCT No.: PCT/DE02/00500

§ 371 (c)(1),
(2), (4) Date: Mar. 26, 2003

(87) PCT Pub. No.: WO02/084330

PCT Pub. Date: Oct. 24, 2002

(65) Prior Publication Data

US 2003/0156015 A1 Aug. 21, 2003

(30) Foreign Application Priority Data

Apr. 12, 2001 (DE) .......................................... 101 18 265

(51) Int. Cl.$^7$ ............................................... B60T 8/32
(52) U.S. Cl. .......................................... 702/147; 701/93
(58) Field of Search ...................... 701/93, 96; 702/94, 702/102; 340/901, 904, 905

(56) References Cited

U.S. PATENT DOCUMENTS 6,721,645 B2 * 4/2004 Lueder et al. ................ 701/93

FOREIGN PATENT DOCUMENTS

| DE | 196 37 245 | 3/1998 |
| EP | 0 890 470 | 1/1999 |
| EP | 1 034 963 | 9/2000 |
| WO | 99 30919 | 6/1999 |
| WO | 99 32318 | 7/1999 |
| WO | 01 79013 | 10/2001 |
| WO | 01 79882 | 10/2001 |

* cited by examiner

*Primary Examiner*—Kamini Shah
(74) *Attorney, Agent, or Firm*—Kenyon & Kenyon

(57) ABSTRACT

A method of detecting a lane change of a subject vehicle (20), having a locating device (10) which uses angular resolution for locating vehicles (VEH1, VEH2, VEH3) traveling in front, and a device (44) for determining the yaw rate ($\omega_0$) of the subject vehicle. The angular velocity ($\omega_i$) of at least one vehicle traveling in front relative to the subject vehicle (20) is measured using the locating device (10), and a lane change signal (LC) indicating the lane change is formed by comparing the measured angular velocity ($\omega_i$) to the yaw rate ($\omega_0$) of the subject vehicle.

10 Claims, 3 Drawing Sheets

METHOD FOR RECOGNIZING A CHANGE IN LANE OF A VEHICLE

BACKGROUND INFORMATION

The present invention relates to a method of detecting a lane change of a vehicle having a locating device which uses angular resolution for locating vehicles traveling in front, and a device for determining the yaw rate of the subject vehicle.

Distance- and speed-regulating devices for motor vehicles, also referred to as ACC (adaptive cruise control) systems, are known. In these systems, objects, for example vehicles traveling in front in the same lane as the subject vehicle, are detected using a locating device, for example a radar system which provides angular resolution, which enables the distance and relative speed of the vehicle traveling in front to be measured. The capability for angular resolution in such a radar system has been used in the past to check the detected objects for plausibility, so that, for example, vehicles in the same lane as the subject vehicle may be distinguished from road signs or markings on the edge of the roadway, or from vehicles in other lanes.

When a vehicle traveling in front in the same lane as the subject vehicle is within the locating range of the radar, the traveling speed is regulated by intervention in the drive or braking system of the vehicle in such a way that a speed-dependent distance from the vehicle traveling in front is maintained. On the other hand, if there is no vehicle within locating range in the same lane as the subject vehicle, the device regulates the speed at an intended speed selected by the driver.

German Patent Application 196 37 245 A1 describes an ACC system in which the evaluation of the radar signal for plausibility is modified when the driver indicates his/her intention to change lanes by actuating the left or right turn indicator. In this situation, the travel corridor taken into account in regulating the distance is temporarily extended to the future new lane, and the vehicles in the former lane as well as the vehicles in the future lane are taken into account in regulating the distance. The travel corridor is defined as a strip of fixed, or optionally variable, width on both sides of the prospective travel path of the subject vehicle. For a straight roadway course, the travel path of the subject vehicle is indicated by a straight line running in the direction of travel through the center of the vehicle. For a curved roadway course, it may be assumed as an approximation that the prospective travel path is a curve of constant curvature. Assuming a steady-state curve situation, the particular curvature may be calculated by defining the yaw rate of the subject vehicle via the traveling speed. In principle, the yaw rate may be determined from the steering angle and the traveling speed, but preferably is directly measured using a yaw rate sensor, in particular since such a yaw rate sensor is already present in vehicles having an electronic stability program (ESP).

In non-steady state situations, however, in particular during a lane change, an accurate determination of the travel corridor has proven to be difficult. Merely evaluating the signal from the turn indicator is of no further use here, since actuation of the turn indicator only indicates the intention to change lanes but does not allow the detection of exactly when the lane change starts and ends. Even making additional allowance for the steering commands of the driver does not enable the lane change to be unambiguously detected, since a curved roadway course may also give rise to the steering commands. In the past, these uncertainties in the detection of a lane change have often caused malfunctions in the regulating system due to the fact that during the lane change the radar beam temporarily sweeps over the edge of the roadway and identifies stationary targets such as road signs or the like as presumably relevant objects, or that for roadways having three or more lanes, vehicles in the next-to-adjacent lane are erroneously associated with the travel corridor of the subject vehicle. To accurately associate objects detected using the locating device with the relevant travel corridor of the vehicle, it would therefore be desirable if a lane change could be reliably identified.

OBJECT, ACHIEVEMENT, AND ADVANTAGES OF THE INVENTION

The object of the present invention is to provide a method which allows a lane change to be more accurately detected.

This object is achieved according to the present invention by the fact that the angular velocity of at least one vehicle traveling in front relative to the subject vehicle is measured using the locating device, and a lane change signal indicating the lane change is produced by comparing the measured angular velocity to the yaw rate of the subject vehicle.

The present invention is based on the concept that, during a lane change, in contrast to traveling along a curve, there is a distinct negative correlation between the relative angular velocity of vehicles traveling in front and the yaw rate of the subject vehicle. This is due to the fact that at the start of a lane change the subject vehicle undergoes a yawing motion, and thus a rotation about the vertical axis, with a relatively high yaw rate, i.e., a relatively high angular velocity, whereas the objects detected by the locating device do not take part in this rotation and therefore have an angular velocity relative to the subject vehicle which is equal in terms of actual amount but opposite in direction. When traveling through a curve of constant curvature, however, the subject vehicle and the vehicles traveling in front—at the same traveling speed—undergo the same rotation, so that the relative angular velocity of the vehicles traveling in front remains approximately zero. Only during travel into or out of a curve is it possible for a definite difference between the relative angular velocity of the vehicle traveling in front and the yaw rate of the subject vehicle to appear, although these differences generally are considerably smaller than those during a lane change. Comparing the relative angular velocities to the yaw rate of the subject vehicle thus provides a very reliable criterion for detecting a lane change.

Advantageous embodiments of the present invention result from the subclaims.

Since at higher traffic densities multiple vehicles traveling in front are generally simultaneously detected by the locating device, it is preferable to form a composite angular velocity from the measured relative angular velocities of several or all of the detected vehicles, for example by forming an average, or a weighted average based on the distance or angle. By assigning greater weight to vehicles which have only a slight angular deviation from the path of the subject vehicle, it is possible to reduce interference effects caused by the relative speeds of the vehicles traveling in front. Similarly, by assigning greater weight to vehicles only a small distance from the subject vehicle, interference effects which appear when entering into a curve are reduced. However, the noise from the angular signal of vehicles in close proximity is generally increased because of the motion of these same vehicles. To suppress such noise, in addition to information on the vehicles it is usually possible to also collect time-specific information. Since the radar measurements are typically repeated periodically in a fixed regulating cycle, information is provided over multiple regulating cycles, so that here as well, a lower weight may be assigned to the older cycles.

In addition, a plausibility effect may occur during the determination of the composite angular velocity. For example, for three or more vehicles which are being localized it may be practical to eliminate outliers whose angular velocity clearly deviates from the other vehicles. Thus, it is possible in particular to reduce interference effects caused by a lane change of one of the vehicles traveling in front. If only two vehicles traveling in front are within the locating range, generally a lane change by one of the vehicles traveling in front is assumed only if one of these vehicles starts to pass or completes the passing maneuver. These situations may be identified using data on the measured distance and relative angular velocity.

Based on similar considerations, it may be advantageous for vehicles which have just appeared in the locating range because they have passed the subject vehicle not to be included in the calculation of the composite angular velocity unless a certain time delay has occurred.

In the determination of the relative angular velocities of the individual vehicles, it may be useful to apply a correction due to the relative speeds of these vehicles. For example, a vehicle which has just been passed by the subject vehicle has a relative angular velocity that is different from zero, without this indicating that the subject vehicle has changed lanes. This relative angular velocity is proportional to the product of the relative speed and the angle at which the vehicle is localized, divided by the distance of this vehicle, and may be eliminated by subtracting an appropriate correction factor.

If the composite angular velocity $\omega_c$ of the vehicle traveling in front and the yaw rate $\omega_0$ of the subject vehicle were determined, a signal LC is obtained which indicates with high reliability a lane change of the subject vehicle by forming the negative of the cross-correlation value of these variables: $LC=-\omega_0^*\omega_c/(\omega_c+\omega_0)$. As soon as this signal exceeds a specified threshold value, it can be assumed that a lane change of the subject vehicle is occurring.

Optionally, the signal from the turn indicator may also be taken into account in such a way that when the turn signal is actuated, the threshold value to which signal LC is compared is decreased. It is also possible to distinguish whether the left or the right turn indicator was actuated, so that the threshold value is decreased only when the lane change occurs in the correct direction. The direction of the lane change is specified by the algebraic sign of $\omega_0$.

Yaw rate signal $\omega_0$ may also be checked for a pattern which is typical of a lane change in order to increase the reliability of the information. During a lane change this: signal exhibits a characteristic S-shaped curve. According to a further embodiment of the present invention, the expected completion of the lane change as well may be predicted from this pattern. Alternatively, it may be assumed that the lane change is completed when a certain time period, which optionally is speed-related, has elapsed after the lane change is detected.

The lane change signal thus obtained may be used within the scope of an ACC system and in many other ways as well. In particular, the travel corridor of the subject vehicle may be appropriately adjusted during detection of the start of a lane change. It is also possible to take into account that at the midpoint of the lane change the direction of travel of the subject vehicle deviates from the direction of the roadway. The value of this angular deviation may be quantitatively determined by integrating the yaw rate signal, the composite angular velocity signal, or a combination of both over time, and may then be used to correct the predicted travel path and thus the travel corridor. In this manner it is possible to prevent the erroneous evaluation of stationary targets during the lane change. In one even simpler embodiment, this effect may also be achieved by reducing the penetration depth of the locating device so that objects farther away continue to be disregarded in the distance regulation.

In addition, the lane change signal may be used to temporarily extend the travel corridor to the adjoining lane which forms the future lane, and to narrow the travel corridor back to the new lane after the lane change is completed. Likewise, it is possible to use the lane change signal to trigger certain additional functions which are implemented in the ACC system, for example a passing aid which assists in merging into the flow of traffic in the future lane by automatically accelerating or decelerating the vehicle. The lane change signal may also be evaluated for special functions besides the actual ACC regulation, for example for lighting control which automatically adjusts the beam direction from the headlights of the vehicle.

Regulating systems are also known which detect the course of the roadway by evaluating a camera image or by using other sensors, and which assist the vehicle in staying within the lane (lane keeping support) by intervening in the steering of the vehicle. When the vehicle is equipped with such a system, it is possible not only to detect the lane change directly by evaluation of the sensor signals which sense the edge of the roadway, but in this case also to use the method according to the present invention for plausibility testing.

BRIEF DESCRIPTION OF THE DRAWING

An exemplary embodiment of the present invention is described in more detail below with reference to the drawing.

DETAILED DESCRIPTION OF AN EXEMPLARY EMBODIMENT

Figure 1:
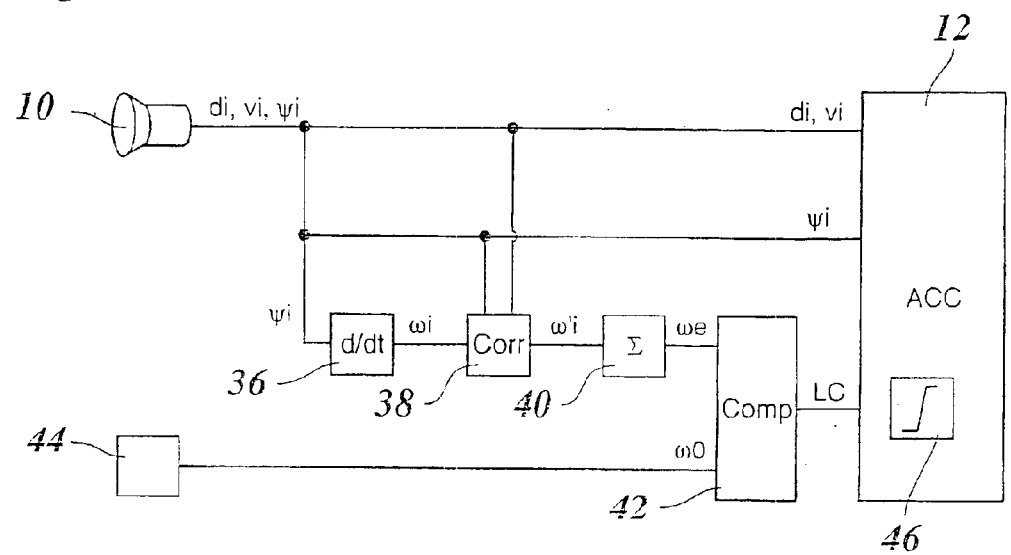
FIG. 1 shows a block diagram of a distance- and speed-regulating system for motor vehicles which is designed to carry out the method according to the present invention.

Because the design and operating principle of a distance- and speed-regulating system, referred to below as an ACC system, are known as such, FIG. 1 shows only those components of such a system that are important for understanding the present invention.

A radar sensor 10 is provided as a locating device for vehicles traveling in front, and is mounted on the front of the regulated vehicle and periodically locates target objects situated in front of the vehicle, for example vehicles traveling in front, and stationary targets on the edge of the roadway. By evaluating the radar echo, signals are produced, either in the radar sensor itself or in a processing unit connected downstream, which indicate the distance $d_i$, the relative speeds $v_i$ (in the radial direction), and the azimuth angles $\psi_i$ of the located objects. The azimuth angles here are defined with respect to the instantaneous straight-ahead direction of the vehicle. Positive azimuth angles correspond to an angular deviation in the mathematically positive sense, and thus to the left.

An electronic regulating device 12 evaluates the data sent by radar sensor 10 and intervenes in the drive system and, if appropriate, also in the braking system of the vehicle in order to regulate the speed of the vehicle to maintain a suitable, speed-dependent distance from the vehicle traveling immediately in front in the same lane as the subject vehicle. If no vehicle traveling in front is localized, the device regulates the speed at an intended speed selected by the driver. Stationary targets on the edge of the roadway are differentiated from vehicles traveling in front based on the angular signals and the relative speed. Since the ACC system is provided primarily for use on multilane freeways and highways, the lane in which the vehicles are situated must also be distinguished for vehicles traveling in front. Normally, only the vehicles in the same lane as the subject vehicle are taken into account for the distance regulation.

Figure 2:
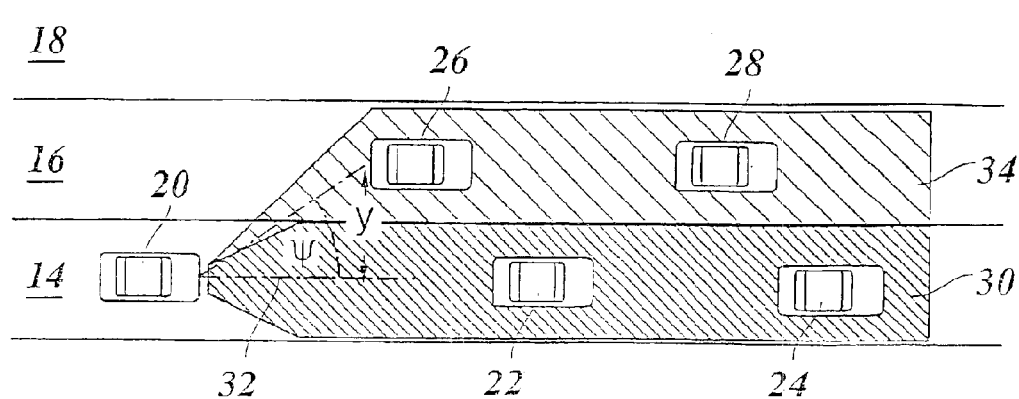
FIG. 2 shows a diagram of a three-lane roadway having travel corridors in which vehicles traveling in front which are relevant to the distance regulation are situated.

FIG. 2 shows as an example a one-directional roadway having three lanes 14, 16, and 18. A vehicle 20 equipped with the ACC system according to FIG. 1, referred to below as the "subject vehicle," travels in right lane 14, and vehicles 22, 24, 26, and 28 traveling in front are situated in lanes 14 and 16. For the distance regulation, only the data from vehicles 22 and 24 situated within a limited distance range in a travel corridor 30, which ideally coincides with lane 14, are taken into account. Travel corridor 30 is defined as a strip of predetermined width on both sides of path 32 which is expected to be followed by subject vehicle 20, and is indicated by a dotted-dashed straight line in FIG. 2. In the example shown, a straight roadway course and a corresponding straight-line path 32 are present. Methods for predicting the travel path on a curved roadway are known as such, and will not be described here in further detail. To decide whether a vehicle is situated within travel corridor 30, a path offset y is determined for each localized object, and a check is performed as to whether, in terms of actual amount, this path offset is less than a threshold value corresponding to one-half of the typical width of a lane. Path offset y, which in FIG. 2 is shown for vehicle 26, may be calculated from measured distance d and azimuth angle $\omega$ of the affected vehicle, and corresponds approximately to the product $d*\psi$.

If the driver of subject vehicle 20 decides to change to middle lane 16, vehicles 26 and 28 situated in travel corridor 34 corresponding to the adjoining lane are also to be taken into account for the distance regulation. After the lane change is completed, if subject vehicle 20 is traveling approximately in the middle of lane 16, only travel corridor 34 is of significance, which however is then defined by the same path offset y as was travel corridor 30 originally. During the lane change, subject vehicle 20 temporarily changes its direction relative to lanes 14, 16, so that prospective path 32 which is defined by the straight-ahead direction of the vehicle no longer corresponds to the actual course of the roadway.

To enable a consistent distance regulation, even during a lane change, and to avoid malfunctions that may irritate the driver or cause discomfort, a method is described here which allows the beginning and also the completion of a lane change to be automatically detected.

As shown in FIG. 1, signals $\psi_i$ sent by distance sensor 10 which indicate the azimuth angle of the localized objects are led to a differentiation element 36 which calculates the associated relative angular velocities $\omega_i$. In practice, this may be carried out so that the azimuth angles measured in successive regulating cycles are subtracted from one another, and the difference is divided by the duration of the regulating cycle (in the range of 1 ms). To suppress noise effects, the raw data thus obtained may subsequently undergo low-pass filtering using a suitable time constant of 0.5 s, for example.

Filtered relative angular velocities $\omega_i$ are then corrected for relative speed-dependent effects in a correction module 38. The nature and purpose of this correction are explained below.

Corrected relative angular velocities $\omega'_i$ are linked in a logic circuit 40 to form a composite angular velocity $\omega_c$ which represents a measure of the change in the angle of the overall composite of all vehicles 22, 24, 26, and 28 traveling in front, relative to subject vehicle 20. Only vehicles traveling in front are taken into account in the calculation of composite angular velocity $\omega_c$, whereas the signals from stationary targets remain disregarded. In the simplest case, the logic operation results in the formation of an average of all vehicles traveling in front; i.e., the sum of relative angular velocities $\omega'_i$ of all vehicles traveling in front is divided by the number of vehicles taken into account. Composite angular velocity $\omega_c$ is then compared to yaw rate $107_0$ of subject vehicle 20 in a comparator circuit 42. To determine yaw rate $\omega_0$, in the example shown a generally known yaw rate sensor 44 is used which measures the Coriolis force which appears during a yaw motion of the vehicle, it being possible to also evaluate the signals from the yaw rate sensor within the scope of a stability regulation for subject vehicle 20. Any systematic error (offset) of yaw rate sensor 44 may be eliminated, if needed, by taking into account the signals from a steering wheel angle sensor, a transverse acceleration sensor, a wheel speed sensor, and the like. The individual signals are also checked for plausibility, and in non-plausible situations a conclusion is made as to the failure of the sensor. The signal from yaw rate sensor 44 may also undergo low-pass filtering, preferably using the same time constants as for the relative angular velocity signals.

In comparator circuit 42 a lane change signal LC is formed from composite angular velocity $\omega_c$ and yaw rate $\omega_0$ according to the following formula:

$$LC = -\omega_c * \omega_0 / (\omega_c + \omega_0) \tag{1}$$

Lane change signal LC is sent to regulating device 12 which, by comparing this signal to a suitable threshold value (symbolized by a threshold value switch 46 in FIG. 1), detects that a lane change by subject vehicle 20 is occurring and then makes the appropriate adjustments in the distance regulation, in particular in the determination of the travel corridor.

Figure 3:
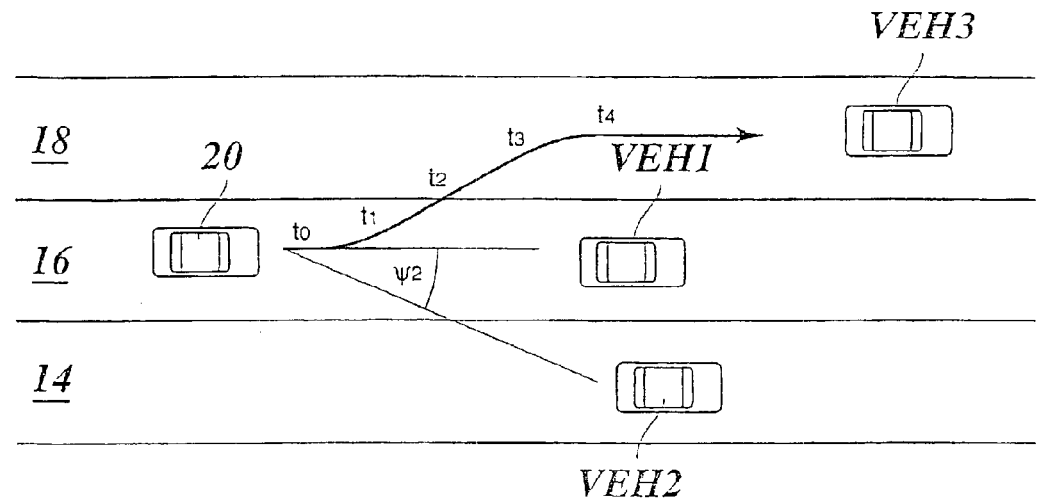
FIG. 3 shows a diagram corresponding to FIG. 2 which illustrates a lane change of the subject vehicle.
Figure 4:
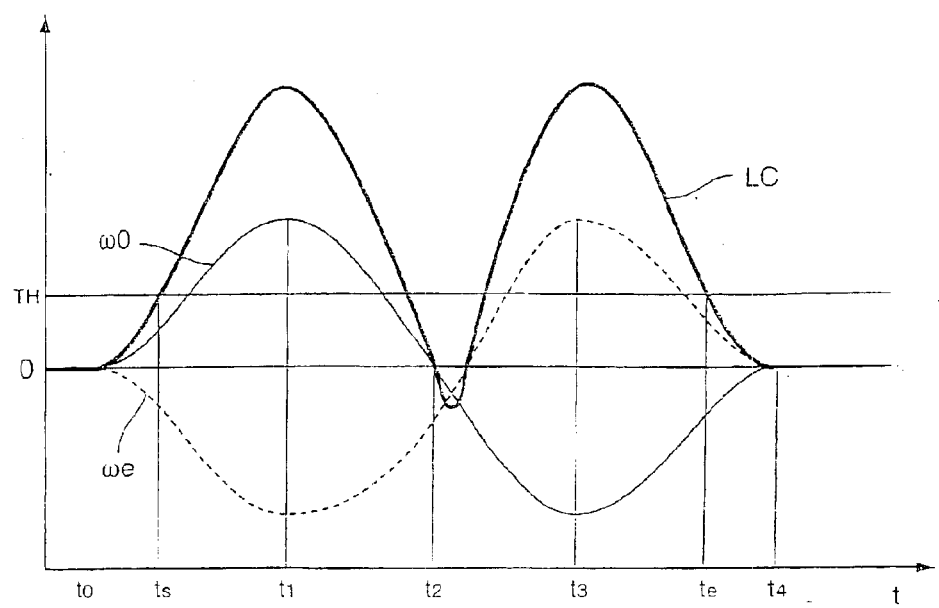
FIG. 4 shows the time curve of various variables which characterize the lane change illustrated in FIG. 3.

FIG. 3 shows the course over time of a lane change of subject vehicle 20, in this case from middle lane 16 to left lane 18. FIG. 4 shows the corresponding time curve for yaw rate $\omega_0$, composite angular velocity $\omega_c$, and lane change signal LC.

At time $t_0$ the lane change has not yet begun, and the path direction of subject vehicle 20 remains parallel to the lane. Yaw rate $\omega_0$ is consequently zero. Relative angular velocity $\omega_1$ of vehicle VEH1 traveling directly in front in lane 16 is also zero. For vehicles VEH2 and VEH3 in the adjoining lanes, however, this is true only if their relative speed is zero, i.e., if their respective distances to subject vehicle 20 remain unchanged. On the other hand, if subject motor vehicle 20 has a higher speed than vehicle VEH2 in lane 14, the (negative) azimuth angle $\psi_2$ for the latter vehicle increases in terms of actual amount, resulting in a negative relative angular velocity $\omega_2$. Similarly, a negative relative angular velocity $\omega_3$ likewise results for vehicle VEH3 in the adjoining left lane if this vehicle is faster than the subject vehicle. Thus, without additional corrections a negative composite angular velocity would result during the formation of an average. To compensate for this effect, correction element 38 makes the following correction:

$$\omega'_i = \omega_i - V_i * \omega_i / d_i \quad (2)$$

As a result of this correction, at time $t_0$ composite angular velocity $\omega_c$ obtained from the formation of the average is also zero. Lane change signal LC produced according to equation (1) also has a value of zero.

Between times $t_0$ and $t_2$, subject vehicle 20 veers left to the adjoining lane, and during this phase has a positive yaw rate which at time $t_1$ is at a maximum. The path direction of subject vehicle 20 also changes, corresponding to the yaw motion. Because the azimuth angle measured by location sensor 10 is based on this changed path direction, composite angular velocity $\omega_c$ assumes a value equal to the yaw rate $\omega_0$ in terms of actual value, but with an opposite sign. The product of the yaw rate and the composite angular velocity is therefore negative, and LC accordingly assumes a relatively high positive value. At time $t_2$ the yaw rate of subject vehicle 20 has again decreased to zero, and a countermotion is initiated for veering into the new lane. At this moment LC again returns to zero. In contrast, composite angular velocity $\omega_c$ still has a small negative value. This is due to the fact that the path direction of subject vehicle 20 at time $t_2$ is not parallel to the path direction of the vehicles traveling in front. For vehicles VEH1 and VEH2 in particular, this results in a negative relative angular velocity even when the relative speed has not become zero. Consequently, the zero crossing of curve $\omega_c$ does not occur until a later time, so that LC temporarily assumes negative values.

At time $t_3$, yaw rate $\omega_0$ reaches a minimum and composite angular velocity $\omega_c$ is at a maximum, and LC also increases again to a maximum. All signals then decrease again to zero until the lane change is completed at time $t_4$.

FIG. 4 shows that the lane change is marked by a characteristic S-shaped curve for yaw rate $\omega_0$ and by a characteristic "camel hump" for lane change signal LC. Threshold value sensor 46 detects the start of a lane change by the fact that lane change signal LC exceeds a specified threshold value TH (at time $t_s$ in FIG. 4). A short-term drop below this threshold value at approximately time $t_2$ indicates the midpoint of the lane change process, whereas another drop below threshold value TH at time $t_e$ indicates the end of the lane change.

Figure 5:
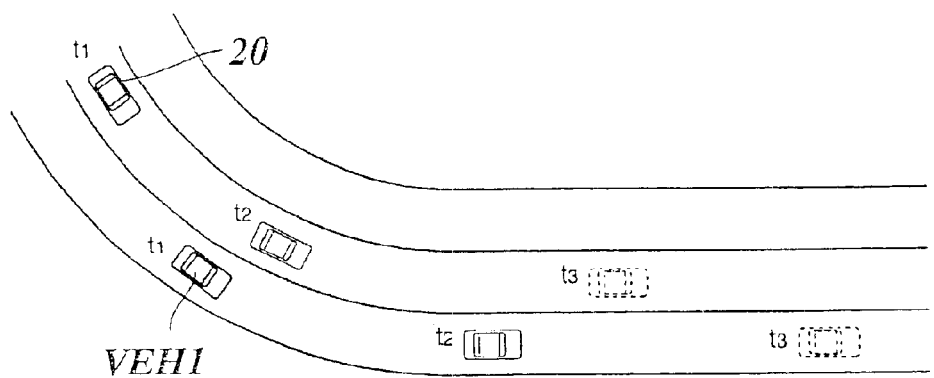
FIG. 5 shows a diagram of a driving situation in which the regulated vehicle and a vehicle traveling in front are driving out of a curve.
Figure 6:
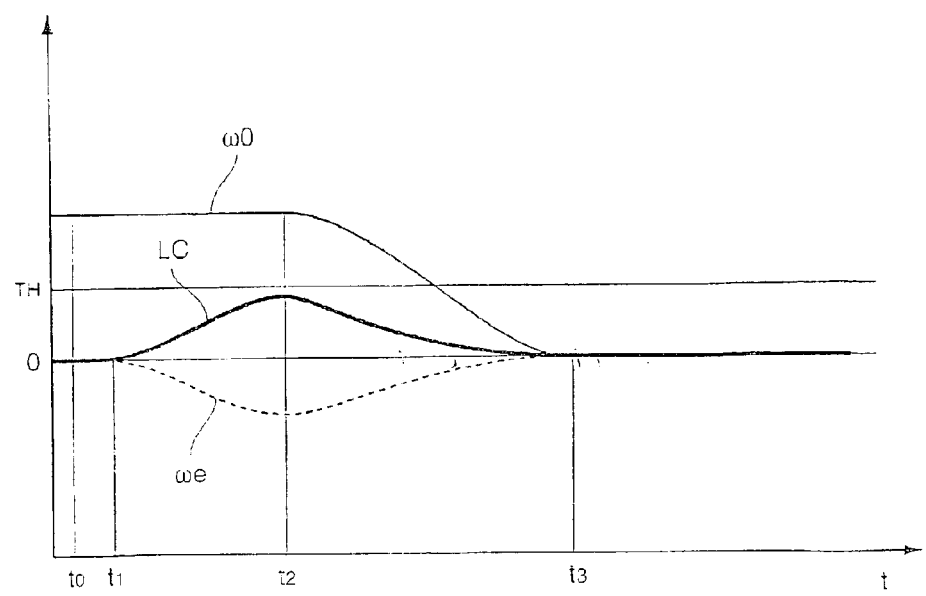
FIG. 6 shows the time curve of the same variables as shown in FIG. 4 for the driving situation illustrated in FIG. 5.

For purposes of comparison, FIGS. 5 and 6 illustrate a driving situation in which no lane change takes place, but instead subject vehicle 20 and a vehicle VEH1 traveling in front travel out of a curve. The positions of both vehicles at time $t_1$ are marked by bold lines in FIG. 5, while the positions at time $t_2$ are marked by thinner lines, and at time $t_3$ by dashed lines.

At time $t_1$ both vehicles are still in the curve. Subject vehicle 20 has a positive yaw rate $\omega_0$. However, for vehicle speeds which are approximately the same, the positions of subject vehicle 20 and vehicle VEH1 relative to one another remain unchanged, so that composite angular velocity $\omega_0$ (which in this case only is indicated by $\omega'_1$) has a value of zero. Consequently, LC is also zero. This means that traveling through a curve is not erroneously interpreted by the system as a lane change.

Vehicle VEH1 traveling in front begins to travel out of the curve between points $t_1$ and $t_2$. Its relative angular velocity therefore decreases, while yaw rate $\omega_0$ of the subject vehicle remains constant. Lane change signal LC is therefore positive and assumes a flat maximum at $t_2$. However, since multilane freeways generally have very large radii of curvature, the yaw rates and relative angular velocities which appear here are very low, so that lane change signal LC remains below threshold value TH.

As a variant of the described method, for signal $\omega_0$ which is used to calculate lane change signal LC it is not the actual measured yaw rate that is used, but instead the instantaneously measured yaw rate minus a moving average from the previously measured yaw rates. When traveling through a curve at a constant actual yaw rate, the moving average would then gradually approach the instantaneous yaw rate, so that signal $\omega_0$ would decrease essentially to zero. Consequently, lane change signal LC between times $t_1$ and $t_2$ in FIG. 6 would remain smaller. After time $t_2$ the instantaneous yaw rate would decrease below the moving average, with the result that signal $\omega_0$ would be negative. Signal LC would thus also be negative between times $t_2$ and $t_3$. Thus, in this variant, threshold value TH could be reduced to increase the sensitivity of the lane change detection.

Regulating device 12 may react in different ways to the detection of a lane change, at time $t_s$ in FIG. 4, depending on the embodiment. For example, the ranging depth of the radar sensor may be reduced so that regulating device 12 then responds to vehicles traveling in front only when they are a very small distance in front of subject vehicle 20 and there is a danger of imminent collision. Thus, if the path direction of subject vehicle 20 runs at an angle to the roadway, at time $t_2$ in FIG. 3, irrelevant objects situated outside the lanes of interest are prevented from being evaluated.

In another embodiment, the original travel corridor is "frozen" when a lane change is detected. This may be achieved by integrating measured yaw rate $\omega_0$ from time $t_s$ forward. The integral then provides approximately the angle of the instantaneous path direction of the vehicle relative to the direction of the roadway. If this angle is subtracted from measured azimuth angle $\psi_i$, the result corresponds to the subject vehicle for remaining in the original travel corridor.

Alternatively, the evaluation of the location signals at time $t_s$ may be limited to those vehicles that were present in the instantaneous travel corridor prior to that time. This is possible because location data $d_i$, $v_i$, and $\psi_i$ measured from one regulating cycle to another for the same vehicle respectively differ only very slightly from one another, so that the individual vehicles may be identified and their motions tracked. Additionally, a collision avoidance strategy may be pursued in which the system responds to vehicles, not previously taken into account, when these vehicles are a very small distance in front of subject vehicle 20.

The signal of the turn indicator may also be included in the evaluation. In the situation shown in FIG. 2, when the driver's intent to make a lane change by actuation of the turn indicator is detectable, the travel corridor may be extended to a combination of both travel corridors 30 and 34. At the same time, threshold value TH may be reduced so that the actual start of the lane change is detected earlier. At the detected start of the lane change, the extended travel corridor is then frozen, and finally, when the end of the lane change is detected at $t_e$, the travel corridor is narrowed to new travel corridor 34.

What is claimed is:

1. A method of detecting a lane change of a subject vehicle including a locating device adapted to use an angular resolution for locating at least one vehicle traveling in front of the subject vehicle and a device for determining a yaw rate of the subject vehicle, comprising:
   measuring an angular velocity of the at least one vehicle relative to the subject vehicle using the locating device; and
   comparing the angular velocity to the yaw rate of the subject vehicle to form a lane change signal indicating the lane change.

2. The method as recited in claim 1, further comprising:
   before the comparing of the angular velocity to the yaw rate, correcting the angular velocity of the at least one vehicle to form another relative angular velocity which is independent of a relative speed of the at least one vehicle.

3. The method as recited in claim 1, further comprising:
   forming a composite angular velocity from one of the angular velocity and the other angular velocity of a plurality of vehicles traveling in front of the subject vehicle, the composite angular velocity representing a relative change in an angle of a combination of the plurality of vehicles; and
   comparing the yaw rate to the composite angular velocity.

4. The method as recited in claim 3, wherein the composite angular velocity includes one of a weighted average of the other angular velocity, an unweighted average of the other angular velocity, a weighted average of the angular velocity, and an unweighted average of the relative angular velocity.

5. The method claim 1, wherein the determining of the yaw rate includes evaluating a signal from a yaw rate sensor.

6. The method as recited in claim 3, further comprising calculating the lane change signal according to a formula which gives a high positive value when the yaw rate of the subject vehicle and one of the angular velocity and the composite angular velocity have values different from zero and have opposite algebraic signs.

7. The method as recited in claim 6, wherein the calculating of the lane change signal includes calculating a cross-correlation of the yaw rate of the subject vehicle using one of the angular velocity and the composite angular velocity.

8. The method as recited in claim 1, further comprising detecting a beginning of the lane change when the lane change signal exceeds a predetermined threshold value.

9. The method as recited in claim 8, further comprising reducing the predetermined threshold value when a turn indicator of the subject vehicle is actuated.

10. The method as recited in claim 8, further comprising detecting a completion of the lane change when the lane change signal falls below the predetermined threshold value for a second time after the detecting of the beginning of the lane change.

* * * * *

UNITED STATES PATENT AND TRADEMARK OFFICE
CERTIFICATE OF CORRECTION

| | | |
|---|---|---|
| PATENT NO. | : 6,889,161 B2 | |
| DATED | : May 3, 2005 | |
| INVENTOR(S) | : Hermann Winner et al. | |

It is certified that error appears in the above-identified patent and that said Letters Patent is hereby corrected as shown below:

Title page,
Item [57], ABSTRACT,
Line 1, change "a subject vehicle" to -- a subject vehicle, --.
Line 2, change "(20), having" to -- using --.
Line 2, delete "(30)".
Line 3, delete "(VEH1, VEH2, VEH3),".
Line 5, change "of the subject vehicle." to -- of the subject vehicle is provided. --.
Line 5, delete "(wi)".
Line 7, delete "[(20)] [(10)]".
Line 8, delete "(LC)".
Line 9, delete "(wi)".
Line 10, delete "(w0)".

Column 1,
Line 5, change "BACKGROUND INFORMATION" to -- FIELD OF THE INVENTION --.
Line 11, insert -- BACKGROUND INFORMATION --.
Line 14, change "are known." to -- are conventional. --.
Lines 15 and 25, change "in front of the same lane as" to -- in front of, and in the same lane as, --.
Line 28, change "in such a way" to -- in such a manner --.
Line 30, change "On the other hand, if" to -- If --.
Line 34, change "German Patent Application 196 37 245 A1 describes" to -- German Published Patent Application No. 196 37 245 discusses --.
Line 54, change "but preferably is" to -- but may possibly be --.

Column 2,
Lines 14-15, change "OBJECT, ACHIEVEMENT, AND ADVANTAGES OF THE INVENTION" to -- SUMMARY OF THE INVENTION --.
Line 16, change "The object of" to -- An exemplary embodiment of --.
Line 16, change "is to provide" to -- provides --.
Line 18, change "This object is achieved according to the present invention" to -- According to an exemplary embodiment of the present invention, --.
Line 25, change "The present invention is based on" to -- An exemplary embodiment of the present invention utilizes --.
Lines 49-50, delete "Advantageous…the subclaims.".
Line 53, change "it is preferable" to -- it may be possible --.

UNITED STATES PATENT AND TRADEMARK OFFICE
CERTIFICATE OF CORRECTION

PATENT NO.    : 6,889,161 B2
DATED         : May 3, 2005
INVENTOR(S)   : Hermann Winner et al.

It is certified that error appears in the above-identified patent and that said Letters Patent is hereby corrected as shown below:

Column 3,
Line 55, change "a further embodiment" to -- an exemplary embodiment --.

Column 4,
Line 5, change "In this manner" to -- In this manner, --.
Line 7, change "In one even simpler embodiment," to -- In an alternative exemplary embodiment, --.
Line 24, delete "are also known".
Line 28, change "of the vehicle." to -- of the vehicle are also conventional. --.
Line 32, change "according to the present invention" to -- according to an exemplary embodiment of the present invention --.
Lines 37-39, delete "An exemplary…to the drawing".
Line 42, change "according to the present invention;" to -- according to an exemplary embodiment of the present invention. --.
Line 45, change "are situated;" to -- are situated. --.
Line 47, change "the subject vehicle;" to -- the subject vehicle. --.
Line 49, change "in FIG.3;" to -- in FIG.3. --.
Line 52, change "of a curve; and" to -- of a curve. --.
Lines 58-59, change "DETAILED DESCRIPTION OF AN EXEMPLARY EMBODIMENT" to -- DETAILED DESCRIPTION --.
Line 62, change "are known as such" to -- are conventional. --.
Line 64, change "the present invention." to -- an exemplary embodiment of the present invention. --.

Column 5,
Lines 24-25, change "must also be distinguished" to -- may also need to be distinguished --.
Line 42, change "are known as such," to -- are conventional, --.

Column 6,
Lines 16-17, change "The nature and pupose of this correction are explained below." to -- This correction is explained below. --.
Line 34, change "known yaw rate" to -- conventional yaw rate --.
Line 45, change "In preferably using" to -- possibly using --.

Column 7,
Line 17, change "at time to" to -- at time t0 --.

UNITED STATES PATENT AND TRADEMARK OFFICE
CERTIFICATE OF CORRECTION

PATENT NO. : 6,889,161 B2
DATED : May 3, 2005
INVENTOR(S) : Hermann Winner et al.

It is certified that error appears in the above-identified patent and that said Letters Patent is hereby corrected as shown below:

Column 8,
Line 21, change "essentially to zero." to -- approximately to zero. --.
Line 38, change "In another embodiment," to -- In another exemplary embodiment, --.

Signed and Sealed this

Twenty-first Day of March, 2006

JON W. DUDAS
*Director of the United States Patent and Trademark Office*